United States Patent
Pessl

(10) Patent No.: US 11,870,901 B2
(45) Date of Patent: Jan. 9, 2024

(54) CRYPTOGRAPHIC PROCESSING DEVICE AND METHOD FOR PERFORMING A LATTICE-BASED CRYPTOGRAPHY OPERATION

(71) Applicant: Infineon Technologies AG, Neubiberg (DE)

(72) Inventor: Peter Pessl, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/878,085

(22) Filed: Aug. 1, 2022

(65) Prior Publication Data

US 2023/0030316 A1 Feb. 2, 2023

(30) Foreign Application Priority Data

Aug. 2, 2021 (DE) ...................... 10 2021 120 010.5

(51) Int. Cl.
*H04L 9/30* (2006.01)
(52) U.S. Cl.
CPC .................. *H04L 9/3093* (2013.01)
(58) Field of Classification Search
CPC .................................................... H04L 9/3093
USPC ......................................................... 713/171
See application file for complete search history.

(56) References Cited

U.S. PATENT DOCUMENTS

| | | | | |
|---|---|---|---|---|
| 9,673,977 B1 * | 6/2017 | Kalach | ................... | H04L 9/0816 |
| 10,097,351 B1 * | 10/2018 | Kelly | ..................... | H04L 9/3093 |
| 10,581,604 B2 * | 3/2020 | Mustafa | ................... | H04L 9/302 |
| 2022/0337389 A1 * | 10/2022 | Gourjon | ................... | H04L 9/002 |
| 2022/0337398 A1 * | 10/2022 | Schneider | ............... | H04L 9/085 |

OTHER PUBLICATIONS

Reparaz, O. et al., "A Masked Ring-LWE Implementation", 17th International Workshop on Cryptographic Hardware and Embedded Systems (CHES 2015), 2015, pp. 683-702.
Oder, T. et al., "Practical CCA2-Secure and Masked Ring-LWE Implementation", IACR Transactions on Cryptographic Hardware and Embedded Systems, 2018, pp. 142-174, vol. 2018, No. 1.
Office Action issued for the corresponding German application No. 10 2021 120 010.5, dated Feb. 8, 2022, 8 pages (for informational purposes only).

* cited by examiner

*Primary Examiner* — Michael S McNally
(74) *Attorney, Agent, or Firm* — VIERING, JENTSCHURA & PARTNER MBB

(57) ABSTRACT

According to various embodiments, a cryptographic processing device is described comprising a processor configured to determine a masking component, generate a masked version of a secret first element by masking multiple components of the secret first element with the masking component, determine a first share of the product of the secret first element and a second element by multiplying the second element with the masked version of the secret first element, determine a second share of the product of the secret first element and the second element by multiplying the second element with the difference of the secret first element and the masked version of the secret first element and continue with a lattice-based cryptography operation using the first share and the second share of the product.

10 Claims, 3 Drawing Sheets

CRYPTOGRAPHIC PROCESSING DEVICE AND METHOD FOR PERFORMING A LATTICE-BASED CRYPTOGRAPHY OPERATION

CROSS-REFERENCE TO RELATED APPLICATION

This application claims priority to German Patent Application Serial No. 10 2021 120 010.5, which was filed Aug. 2, 2021, and is incorporated herein by reference in its entirety.

TECHNICAL FIELD

The present disclosure relates to cryptographic processing devices and methods for performing a lattice-based cryptography operation.

BACKGROUND

With the development of quantum computers alternatives to classical asymmetric cryptosystems like RSA (Rivest Shamir Adleman) and ECC (Elliptic Curve Cryptography) are investigated which cannot be attacked by quantum computers. Currently, quantum computers which are sufficiently powerful are not available due to the technical complexity and engineering challenges but once built they will be able to break RSA and ECC in polynomial time. Therefore, standardization bodies like NIST (National Institute of Standards and Technology) now actively investigate alternative cryptosystems. Schemes that are supposed to resist attacks by quantum computers are, among others, lattice-based public key encryption, key exchange, or signature schemes.

They could become the successor of RSA and ECC and typically operate on large matrices (standard lattices) or polynomial rings (ideal lattices). Accordingly, the execution of most lattice-based cryptographic schemes involves some form of multiplication of large matrices, vectors, or polynomials. This already leads to high memory requirements which are further increased by further protection measures which are typically necessary to make the implementation of the cryptosystems secure, like masking to protect against side-channel attacks. This may result in memory requirements which security controllers (like on a chip card) may not be able to fulfill, thus leading to security issues for security controllers, at least when large quantum computers become available. Therefore, approaches are desirable which allow secure implementation of post-quantum cryptosystems, in particular lattice-based cryptographic schemes, on security controllers.

SUMMARY

According to various embodiments, a cryptographic processing device is provided including a processor configured to determine a masking component, generate a masked version of a secret first element by masking multiple components of the secret first element with the masking component, determine a first share of the product of the secret first element and a second element by multiplying the second element with the masked version of the secret first element, determine a second share of the product of the secret first element and the second element by multiplying the second element with the difference of the secret first element and the masked version of the secret first element and continue with a lattice-based cryptography operation using the first share and the second share of the product.

According to a further embodiment, a method for performing a lattice-based cryptography operation according to the above cryptographic processing device is provided.

BRIEF DESCRIPTION OF THE DRAWINGS

In the drawings, similar reference characters generally refer to the same parts throughout the different views. The drawings are not necessarily to scale, emphasis instead generally being placed upon illustrating the principles of the invention. In the following description, various aspects are described with reference to the following drawings, in which.

DESCRIPTION

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

The examples described herein can be realized as instructions processed by a processor of a processing device like a personal computer, microcontroller, smart card, secure microcontroller, hardware root of trust, (embedded) secure element (ESE), Trusted Platform Module (TPM), or Hardware Security Module (HSM).

Figure 1:
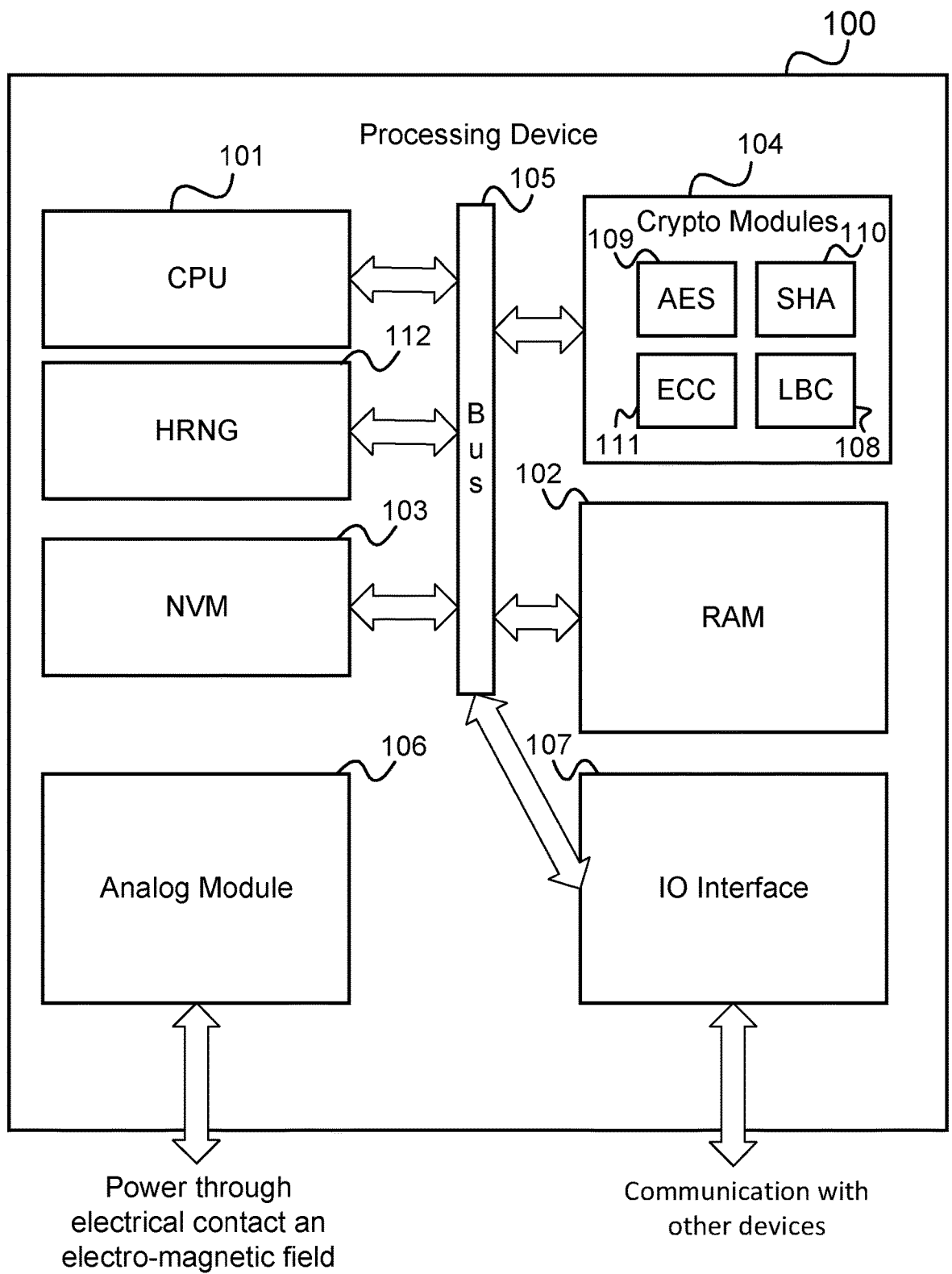
FIG. 1 shows an example for a processing device supporting lattice-based cryptography.

FIG. 1 shows an example for a processing device 100 including a CPU 101, a RAM 102, a non-volatile memory 103 (NVM), a crypto module 104, an analog module 106, an input/output interface 107 and a hardware-random number generator 112.

In this example, the CPU 101 (which may for example be an application processor) has access to at least one crypto module 104 (which may be part of a hardware security module) over a shared bus 105 to which each crypto module 104 is coupled. The shared bus is only an example and there may be individual interfaces between the various components. Each crypto module 104 may in particular include one or more crypto cores to perform certain cryptographic operations. Exemplary crypto cores are:
  an AES core 109,
  a SHA core 110,
  an ECC core 111, and
  a lattice-based crypto (LBC) core 108.

The lattice-based crypto core 108 may be provided in order to accelerate lattice-based cryptography.

The CPU 101, the hardware random number generator 112, the NVM 103, the crypto module 104, the RAM 102 and the input/output interface 107 are connected to the bus 105. The input output interface 107 may have a connection 114 to other devices, which may be similar to the processing device 100.

The analog module 106 is supplied with electrical power via an electrical contact and/or via an electromagnetic field. This power is supplied to drive the circuitry of the processing device 100 and may in particular allow the input/output interface to initiate and/or maintain connections to other devices via the connection 114.

The bus 105 itself may be masked or plain. Instructions for carrying out the processing and algorithms described in the following may in particular be stored in the NVM 103 and processed by the CPU 105. The data processed may be stored in the NVM 103 or in the RAM 102. Supporting functions may be provided by the crypto modules 104 (e.g., expansion of pseudo random data). Random numbers (e.g. for masks) are supplied by the hardware-random number generator 112.

The processing and algorithms described in the following may exclusively or at least partially be conducted on the crypto module 104, e.g., on the lattice-based crypto core 108 (although they may also be performed on CPU 101 in case there is no corresponding crypto module present on the processing device 100). A crypto module 104 may or may not be equipped with hardware-based security features. Such hardware-based security features could be circuits that implement countermeasures against side-channel power analysis or fault injection (e.g., using a laser). This in particular includes masking, i.e. splitting secret data into multiple shares. Such countermeasures can be realized by the use of randomness, redundant hardware, or redundant processing. In general the goal of countermeasures is to disguise the internally processed values from an attacker who is able to observe the physical effect the processing of such values.

To perform the procedures described in the following, instructions may be stored in the lattice-based crypto core 108 or they may be provided by the CPU 101 via the bus 105. Data may be stored locally within the lattice-based crypto core 108. It is also an option that the data is temporarily stored in the RAM 102 or the NVM 103. The lattice-based crypto core 108 may also use other crypto modules to provide supporting functions (e.g., expansion of pseudo random data). The lattice-based crypto core 108 may also include a hardware-random number generator 112 or a means to generate physical and/or software random numbers (e.g. for masks).

The lattice-based crypto core 108 may support operations like polynomial addition or polynomial multiplication on data structures like array of coefficients, the sampling of random polynomials.

In another instance, the procedures described herein may at least partially be realized as a fixed CMOS circuit in the lattice-based crypto core 108 that is not controlled by the CPU 101 directly and where no intermediate values are available outside of the crypto core 108. Additionally, the accelerator may implement specific schemes as described in the literature like NewHope key exchange, Kyber public key encapsulation, Dilithium signature scheme, or Frodo public-key encryption. In this case only high level functionality is available to the CPU 101. Exemplary, a signature may be generated where a message and a private key is transmitted into the lattice-based crypto core 108 over the bus 105 and then a Dilithium signature is computed that is retrieved by the CPU 101 using the bus 105 for further processing.

The components of the processing device 100 may for example be implemented on a single chip. The processing device 100 may be a chip card (or a chip card module) powered by direct electrical contact or through an electromagnetic field. The processing device 100 may be a fixed circuit or based on reconfigurable hardware (e.g., Field Programmable Gate Array, FPGA). The processing device 100 may be coupled to a personal computer, microcontroller, FPGA or a smart phone System on a Chip (SoC) or other components of a smart phone. The processing device 100 may be a chip that acts as Trusted Platform Module (TPM) offering cryptographic functionality (secure storage, secure time, signature generation and validation, attestation) according to a standardized interface to a computer, smart phone, Internet of Things (IoT) device, or car.

The execution of most lattice-based cryptographic schemes involves some form of multiplication of large matrices, vectors, or polynomials, each composed of many values typically smaller than 32 bits. In the lattice-based digital signature scheme Dilithium, for instance, one needs to perform operations of the form b=A·s, where A is a public (k×k) matrix and b, s are secret length-k vectors. Each element in b, A, s is a polynomial of length n=256, where each polynomial coefficient is taken modulo a 23-bit prime number q. This matrix-vector and the involved polynomial multiplications are expensive in terms of runtime and storing the inputs/outputs requires lots of memory. For the smallest Dilithium parameter set (k=4), s and b each need 4 kB of storage.

The vector s is typically secret and needs to be protected against side-channel attacks. This can be done through the use of masking. There, s is represented by two (or more) vectors (shares) s', s" such that s=s'+s", but the two shares are on their own statistically independent of s. This is typically achieved by randomly sampling a s", and then computing s'=s−s". The vector s" can be seen as a mask for the vector s and the vector s' as the masked version of s.

A masked matrix-vector multiplication is then performed by A·s=(A·s')+(A·s")=(b')+(b"). Parentheses are used to signify that the shares are computed separately, the two outcome shares also need to be used in masked manner and not directly recombined.

A simple implementation of this masking approach requires the computation of two (instead of one) matrix-vector multiplications. As such a multiplication is typically very costly, doubling it can significantly increase the overall computation time. Memory requirements also double, as both shares of s and b need to be stored. This is problematic for resource-constrained processing devices, such as security controllers like in smart cards.

In view of the above, according to various embodiments, an approach is provided which allows performing a masked multiplication using significantly less resources. Both the runtime and the memory overhead are reduced, from originally a factor of two down to a constant increase (independent of, e.g., k).

According to one embodiment, a basic idea of the approach provided can be seen in that one of the two shares is composed of multiple copies of a smaller element (which is referred to as a masking component), i.e., to reuse masking components (in the formation of a share). Since multiple entries of A are then multiplied with the same value, one can speed up the multiplication with this compressed share by pre-computing the row sums of A and then multiplying the reused element with the row sums (as described in more detail below). Further, an independent sampling of an output mask (also in compressed form) may be used to prevent accidental unmasking and also allows storing one share of the product in compressed form.

In the following, a more detailed explanation and examples are given. For ease of understanding of these examples, vector and matrix elements can be considered as scalars. However, in reality (e.g. when using Dilithium) they are polynomials, which can require certain adaptations.

Considering the case that k=3, then one can write b=A·s as $$\begin{pmatrix} b_0 \\ b_1 \\ b_2 \end{pmatrix} = \begin{pmatrix} a_{00} & a_{01} & a_{02} \\ a_{10} & a_{11} & a_{12} \\ a_{20} & a_{21} & a_{22} \end{pmatrix} \cdot \begin{pmatrix} s_0 \\ s_1 \\ s_2 \end{pmatrix}, \quad (1)$$

where each element of A, s, and b is a polynomial in the ring $\mathbb{R} = \mathbb{Z}_q[x]/(x^n+1)$, with n=256 and q a small, e.g., 23-bit, prime number.

As described above, using straight-forward masking, one would split s by sampling a random s", then define the shares as $$\begin{pmatrix} s_0 \\ s_1 \\ s_2 \end{pmatrix} = \begin{pmatrix} s'_0 \\ s'_1 \\ s'_2 \end{pmatrix} + \begin{pmatrix} s''_0 \\ s''_1 \\ s''_2 \end{pmatrix} = \begin{pmatrix} s_0 - s''_0 \\ s_1 - s''_1 \\ s_2 - s''_2 \end{pmatrix} + \begin{pmatrix} s''_0 \\ s''_1 \\ s''_2 \end{pmatrix} \quad (2)$$

and finally compute b'=A·s' and b"=A·s" separately. This approach roughly doubles the memory and runtime requirements of the multiplication.

According to one embodiment, s is instead masked as follows.

$$\begin{pmatrix} s_0 \\ s_1 \\ s_2 \end{pmatrix} = \begin{pmatrix} s'_0 \\ s'_1 \\ s'_2 \end{pmatrix} + \begin{pmatrix} m \\ m \\ m \end{pmatrix} = \begin{pmatrix} s_0 - m \\ s_1 - m \\ s_2 - m \end{pmatrix} + \begin{pmatrix} m \\ m \\ m \end{pmatrix} \quad (3)$$

That is, the mask polynomial m (generally referred to as masking component) is reused k=3 times. As only one copy of m needs to be stored (instead of the full vector s"), the memory needs for storing the shared version of s is reduced from 2k=6 polynomials to k+1=4 polynomials.

As s is multiplied with a matrix, reusing a mask polynomial multiple times also allows reducing the runtime of masked multiplication.

Consider the multiplication of the first row of A with s". This can be simplified as follows:

$$(a_{00} \; a_{01} \; a_{02}) \cdot \begin{pmatrix} m \\ m \\ m \end{pmatrix} = a_{00} \cdot m + a_{01} \cdot m + a_{02} \cdot m = (\Sigma_i \; a_{0i}) \cdot m \quad (4)$$

The row sum $\Sigma_i a_{0i}$ can either be precomputed (in case A is static, e.g., part of the public key), or computed on the fly in a significantly reduced runtime (compared to using k polynomial multiplications). The entire masked multiplication of A·s can thus be written as:

$$A \cdot s = \left( \begin{pmatrix} a_{00} & a_{01} & a_{02} \\ a_{10} & a_{11} & a_{12} \\ a_{20} & a_{21} & a_{22} \end{pmatrix} \cdot \begin{pmatrix} s'_0 \\ s'_1 \\ s'_2 \end{pmatrix} \right) + \left( \begin{pmatrix} \Sigma_i \; a_{0i} \\ \Sigma_i \; a_{1i} \\ \Sigma_i \; a_{2i} \end{pmatrix} \cdot m \right) \quad (5)$$

Directly performing the multiplication as written above can lead to two problems. First, the masked output of the multiplication needs to be stored using 2k polynomials, thus potentially eliminating the savings due to mask reuse.

Second, the output of the multiplication might be accidentally unmasked. Consider the possible scenario that $\Sigma_i a_{0i}=0$ and followingly $(\Sigma_i a_{0i}) m=0$. Then, the first line of A·s' must be equal to A·s. In other words, a part of the masked product is unmasked.

The matrix A is typically either known to the attacker, or the attacker can even choose it. Thus, the attacker can test for the occurrence of this scenario or even force it.

Both these problems can be avoided by first sampling an output masking component u and then computing the product using said a mask formed of copies of the output masking component u (such that the output mask may again be stored in a compressed manner). Then, the multiplication becomes:

$$A \cdot s = \left( \begin{pmatrix} u \\ u \\ u \end{pmatrix} \right) + \left( \begin{pmatrix} -u \\ -u \\ -u \end{pmatrix} + \begin{pmatrix} a_{00} & a_{01} & a_{02} \\ a_{10} & a_{11} & a_{12} \\ a_{20} & a_{21} & a_{22} \end{pmatrix} \cdot \begin{pmatrix} s'_0 \\ s'_1 \\ s'_2 \end{pmatrix} + \begin{pmatrix} \Sigma_i \; a_{0i} \\ \Sigma_i \; a_{1i} \\ \Sigma_i \; a_{2i} \end{pmatrix} \cdot m \right) \quad (6)$$

Where $$\begin{pmatrix} u \\ u \\ u \end{pmatrix}$$

can be seen as the output mask formed of the output masking component u.

Using the above formulation, both the input and the output of the multiplication can be stored in a compressed manner (i.e. each time k+1 instead of 2k polynomials). For the right part of Equation (6), it is important to initialize the summation with −u as to avoid the risk of unmasking. This means that it should be avoided to compute the above in the order of, e.g., $$\left( a_{00} \; s'_0 + a_{01} \cdot s'_1 + a_{02} \cdot s'_2 + \left( \sum_i a_{0i} \right) \cdot m \right) - u,$$

as the intermediate in the parentheses corresponds to the unmasked result. Instead one can compute, e.g., $$\left( ((-u + a_{00} \cdot s'_0) + a_{01} \cdot s'_1) + a_{02} \cdot s'_2) + \left( \sum_i a_{0i} \right) \cdot m \right).$$

The exact ordering is not important, but it must be ensured that u is contained in the innermost parentheses.

In Kyber, Dilithium, and certain other schemes, polynomial multiplication is commonly performed using the Number Theoretic Transform (NTT), which can be seen as a number-theoretic analogue to the Discrete Fourier Transform. Using the convolution theorem, polynomial multiplications can be computed as a·b=INTT(NTT(a) ⊙ NTT(b))=INTT($\underline{a}$⊙$\underline{b}$), where ⊙ denotes a pointwise multiplication and $\underline{a}$ the NTT-transformed of the polynomial a. This reduces the runtime from $n^2$ to n log n. Since the NTT is a linear transformation, one can compute a sum of products by summing up the point-wise multiplications and then only performing a single inverse NTT (INTT) on the result. This means that a multiplication according to (6) can be performed using the following operations:

1. Sample a random $\underline{m}$ directly in NTT domain
2. Sample a random u and compute $\underline{u}$ 3. Compute $\text{INTT}((((-\underline{u}+\underline{a_{00}}\odot\underline{s'_0})+\underline{a_{01}}\odot\underline{s'_1})+\underline{a_{02}}\odot\underline{s'_2})+(\Sigma_i\underline{a_{0i}})\odot\underline{m})$ The matrix A and the secret vector s are often already given in their NTT form.

On first glance, performing a masked multiplication the above method reduces the number of polynomial multiplications from $2k^2$ to $k^2+k$. In practice, the savings may depend on the concrete setting. Using multiplication with the NTT with Equation (6), the number of point-wise products is indeed reduced from $2k^2$ to $k^2+k$, whereas the number of inverse NTTs is decreased from $2k$ to $k+1$. For schemes using some other multiplication method, the run-time savings differ. Other factors, such as the choice of the modular reduction algorithm, might also affect the concrete runtime savings.

It should be noted that measures may be taken to avoid accidental unmasking through micro-architectural effects. For instance, when first loading $s'_0=(s_0-m)$ immediately followed by $s'_1=(s_1-m)$, then microarchitectural effects, such as glitches in the register file, might lead to leakage that roughly correlates to the difference of two subsequent operands. In the described scenario, this difference is $(s_0-m)-(s_1-m)=s_0-s_1$, i.e., an unmasked quantity. Such effects typically only need to be considered when processing both shares at once, whereas here, they also need to be considered when operating on a single share s'.

The approach described above can be used with several granularities and can be combined with other countermeasures. Some of these are now described.

The approach described above can be used to achieve cheap higher-order masking, where keys and other sensitive intermediates are split into more than two shares. One can use multiple compressed shares, or combine, e.g., two full shares with an additional compressed share.

It should be noted that without further countermeasures, using multiple compressed shares will never result in more than first-order security. This is because the difference in the full shares leaks secret values, e.g., the difference between $s'_0=(s_0-m'-m'')$ and $s'_1=(s_1-m'-m'')$) unveils the value of $s_0-s_1$.

The approach described above can be combined with other countermeasures to improve the achieved security level. For instance, instead of reusing the same exact mask multiple times, one can derive multiple masks from the sampled mask.

For instance, different scalar factors $c_i$ can be used for each use of the mask. Concretely, the masked representation of s would then be:

$$s = \begin{pmatrix} s_0 \\ s_1 \\ s_2 \end{pmatrix} = \left(\begin{pmatrix} s_0 - c_0 m \\ s_1 - c_1 m \\ s_2 - c_2 m \end{pmatrix}\right) + \left(\begin{pmatrix} c_0 m \\ c_1 m \\ c_2 m \end{pmatrix}\right)$$

This representation can still allow faster masked implementation, as $$(a_{00}\ a_{01}\ a_{02}) \cdot \begin{pmatrix} c_0 m \\ c_1 m \\ c_2 m \end{pmatrix} = \left(\sum_i a_{0i} \cdot c_i\right) \cdot m$$

Similarly, it is also possible to multiply the polynomial m(x) (the polynomial variable x is written explicitly here) with different factors $x^i$. For Kyber and Dilithium, this corresponds to a negacyclic rotation of the polynomial coefficients and can thus be more easily computed.

In the above examples, reuse of masking components is applied on the granularity of polynomials. That is, a polynomial m is reused k times to form a mask. The approach fits well for schemes using a module structure, i.e., schemes which work with matrices and vectors composed of polynomials. Examples of such schemes are the digital signature scheme Dilithium and the key-encapsulation schemes Kyber and Saber.

However, there exist lattice-based schemes which do not work with polynomials and use large matrices and vectors of scalars directly (such as FrodoKEM). The lattice-based KEM (Key Encapsulation Mechanism) NewHope does not use matrices and vectors altogether and instead operates on larger polynomials. The approach can still be applied to such schemes, but other granularities have to be used, e.g., one can sample a block of l random entries, and then use these n/l times to fill up the entire vector or polynomial, respectively.

For schemes using matrices/vectors of polynomials, such as Kyber and Dilithium, different granularities may also be used. One can, e.g., compose m of multiple copies of an even smaller polynomial, to further save on memory. This can, in theory, be done down to the level of scalars, i.e., where m consists of n copies of a single value. One can also decrease the reuse level, e.g., by sampling multiple m and then reusing each one only once. As an example, when using k=4, an $(m_0, m_1)$ can be sampled and then the second share s' can be composed as $(m_0, m_1, m_0, m_1)$. This can help to increase side-channel robustness at the cost of higher memory usage.

In summary, according to various embodiments, a cryptographic processing device is provided as described in the following with reference to FIG. 2.

Figure 2:
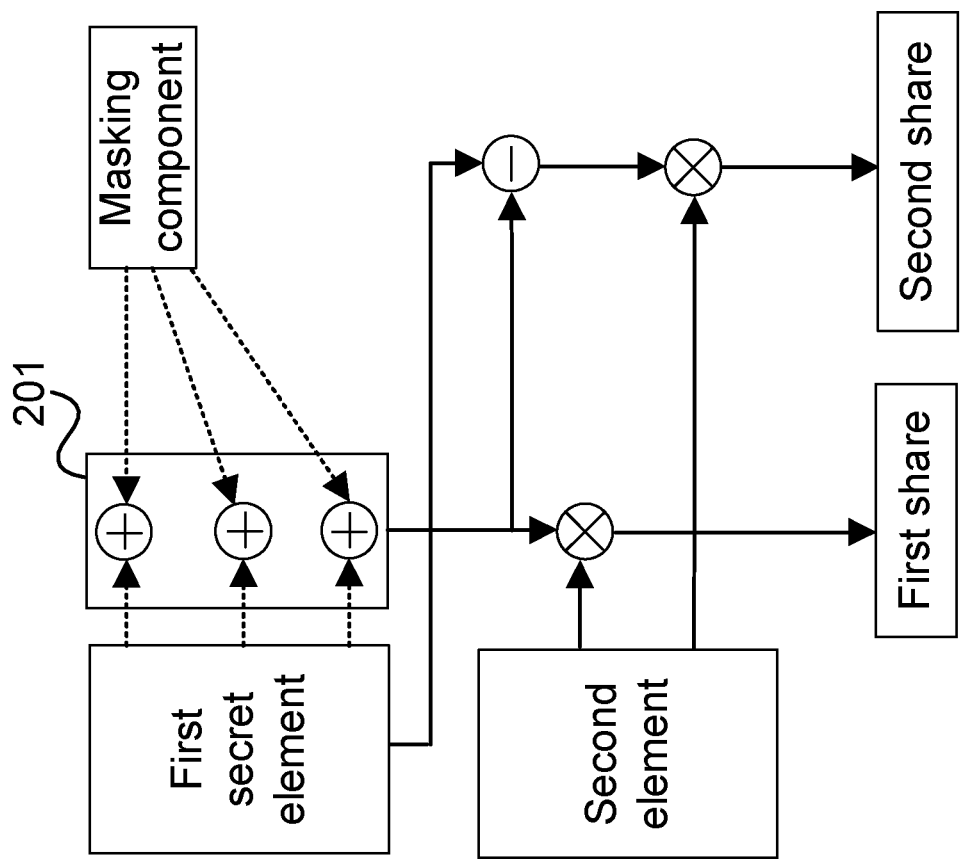
FIG. 2 shows a diagram illustrating the processing of a cryptographic processing device according to an embodiment.

FIG. 2 shows a diagram 200 illustrating the processing of a cryptographic processing device according to an embodiment.

In FIG. 2, dashed lines represent components and full lines represent full elements (vector or matrix). The block 201 with the three adders represents the formation of a vector, wherein each adder gives one component.

The cryptographic processing device includes a processor configured to
  determine a masking component (m)
  generate a masked version (s' in the above example) of a secret first element $$(s' = \begin{pmatrix} s_0 - m \\ s_1 - m \\ s_2 - m \end{pmatrix})$$

in the above example) by masking multiple components ($s_0$, $s_1$, $s_2$ in the above example) of the secret first element with the (same) masking component ($-m$ in the above example)
  determine the product of a second element (A in the above example) with the masked version of the secret first element (s' in the above example) to determine a first share of the product between the secret first element and the second element (first share of b=A·s in the above example);
  determine the product of the second element (A in the above example) with the difference $$(s' - s, \text{i.e.} \begin{pmatrix} m \\ m \\ m \end{pmatrix})$$

in the above example) of the secret first element and the masked version of the secret first element $$\left( A \begin{pmatrix} m \\ m \\ m \end{pmatrix} \right)$$

in the above example to determine a second share of the product between the secret first element and the second element (second share of b=A·s in the above example).

perform the lattice-based cryptography operation using the first share and the second share of the product.

According to various embodiments, in other words a masking component is re-used for masking multiple components of a secret first element that is multiplied with another element. Re-using the masking component saves memory requirements and may also reduce computational effort. Thus, the approach of FIG. 2 makes implementation of lattice-based cryptography with masking possible on low-memory devices such as security controllers and thus ensures their security even when quantum computers have become available.

The approach of FIG. 2 allows efficient masking of lattice-based cryptographic schemes. It may for example be applied to Kyber, Saber, NTRU, Dilithium and Falcon.

The cryptographic processor may for example be part of a processing device like described with reference to FIG. 1 and may in particular correspond to a crypto module (e.g. lattice-based crypto (LBC) core 108, a CPU, an application processor, etc.

The processor may in particular be a circuit which may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program, e.g. a computer program using a virtual machine code such as e.g. Java. Any other kind of implementation of the respective functions which are described herein may also be understood as a "circuit" in accordance with an alternative embodiment.

Figure 3:
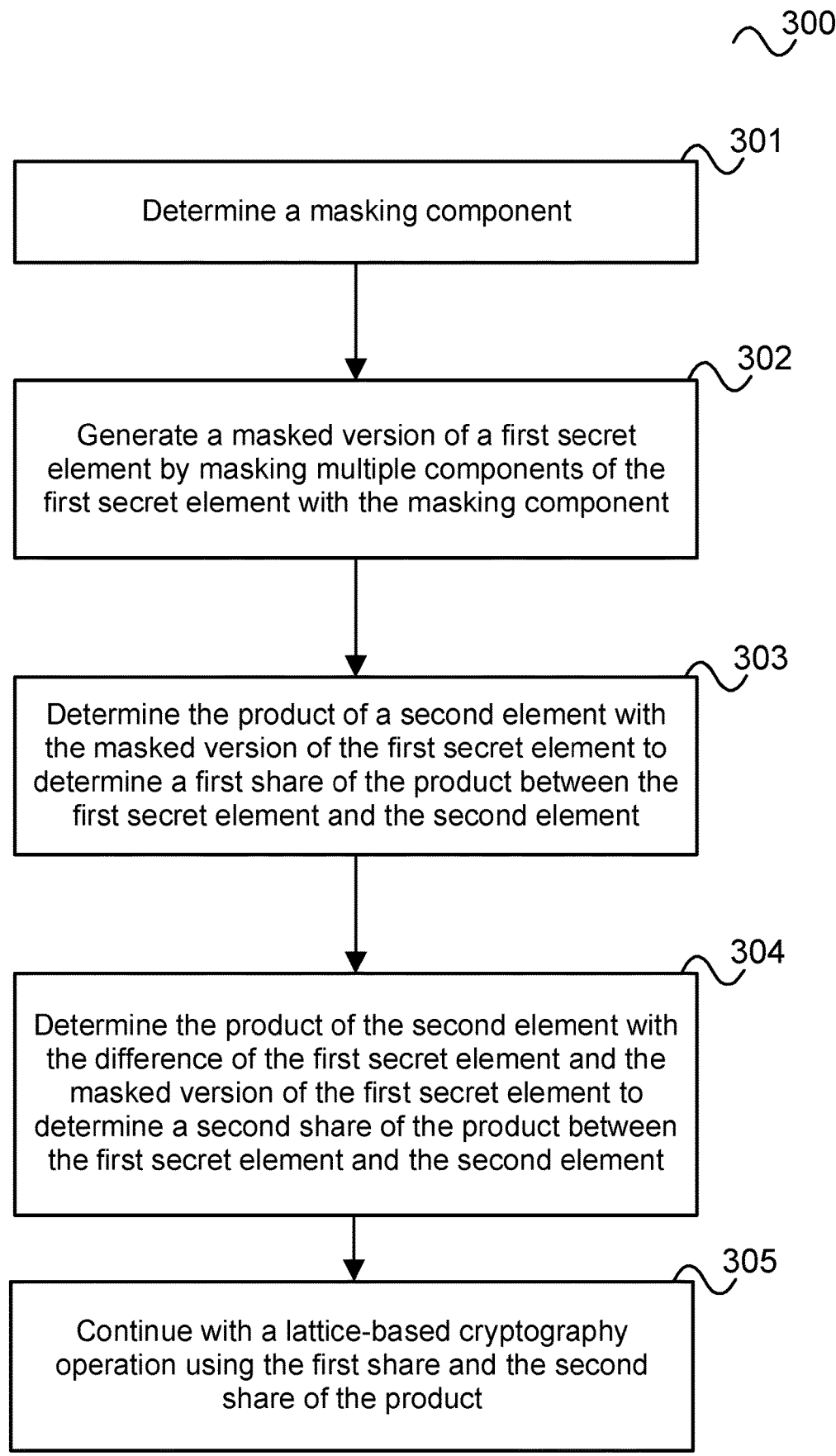
FIG. 3 illustrates a method for performing a lattice-based cryptography operation.

FIG. 3 illustrates a method for performing a lattice-based cryptography operation.

In 301, a masking component is determined.

In 302, a masked version of a secret first element is determined by masking multiple components of the secret first element with the masking component.

In 303, the product of a second element with the masked version of the secret first element is determined to determine a first share of the product between the secret first element and the second element;

In 304, the product of the second element with the difference of the secret first element and the masked version of the secret first element is determined to determine a second share of the product between the secret first element and the second element.

In 305, a lattice-based cryptography operation is continued with using the first share and the second share of the product.

Various Examples are described in the following:

Example 1 is a cryptographic processing device including a processor configured to determine a masking component, generate a masked version of a secret first element by masking multiple components of the secret first element with the masking component, determine a first share of the product of the secret first element and a second element by multiplying the second element with the masked version of the secret first element, determine a second share of the product of the secret first element and the second element by multiplying the second element with the difference of the secret first element and the masked version of the secret first element; and continue with a lattice-based cryptography operation using the first share and the second share of the product.

Example 2 is the cryptographic processing device of Example 1, wherein the processor is further configured to determine a further masking component, mask multiple components of the sum of the first share of the product and the second share of the product using the further masking component to generate a masked version of the product and perform the lattice-based cryptography operation using the masked version of the product.

Example 3 is the cryptographic processing device of Example 1 or 2, wherein generating the masked version of the secret first element includes masking multiple components of the secret first element by the masking component.

Example 4 is the cryptographic processing device of Example 3, wherein masking the multiple components by the masking component includes adding the masking component or a scalar multiple of the masking component to each of the multiple components.

Example 5 is the cryptographic processing device of any one of Examples 1 to 4, wherein the processor is further configured to determine a further masking component, wherein generating the masked version of the secret first element includes masking a first set of components of the secret first element by the masking component and a second set of components of the secret first element by the further masking component.

Example 6 is the cryptographic processing device of Example 5, wherein the first set and the second set are disjoint.

Example 7 is the cryptographic processing device of any one of Examples 1 to 6, wherein the secret first element is a vector of polynomials, wherein the second element is a matrix of polynomials and the masking component is a polynomial.

Example 8 is the cryptographic processing device of any one of Examples 1 to 7, wherein the secret first element is a polynomial and the masking component is a coefficient for a polynomial.

Example 9 is the cryptographic processing device of any one of Examples 1 to 8, wherein the secret first element at least partially represents a cryptographic key.

Example 10 is the cryptographic processing device of any one of Examples 1 to 9, wherein the cryptographic processing device is a security controller.

Example 11 is the cryptographic processing device of any one of Examples 1 to 10, including a random number generator, wherein the processor is configured to determine the masking component using an output of the random number generator.

Example 12 is the cryptographic processing device of any one of Examples 1 to 11, wherein the processor is configured to perform the lattice-based cryptography operation in a signature or public key crypto processing.

Example 13 is a method for performing a lattice-based cryptography operation as described with reference to FIG. 3.

Example 14 is the method of Example 13, further including determining a further masking component, masking multiple components of the sum of the first share of the product and the second share of the product using the further masking component to generate a masked version of the product and performing the lattice-based cryptography operation using the masked version of the product.

Example 15 is the method of Example 13 or 14, wherein generating the masked version of the secret first element includes masking multiple components of the secret first element by the masking component.

Example 16 is the method of Example 15, wherein masking the multiple components by the masking component includes adding the masking component or a scalar multiple of the masking component to each of the multiple components.

Example 17 is the method of any one of Examples 13 to 16, further including determining a further masking component, wherein generating the masked version of the secret first element includes masking a first set of components of the secret first element by the masking component and a second set of components of the secret first element by the further masking component.

Example 18 is the method of Example 17, wherein the first set and the second set are disjoint.

Example 19 is the method of any one of Examples 13 to 18, wherein the secret first element is a vector of polynomials, wherein the second element is a matrix of polynomials and the masking component is a polynomial.

Example 20 is the method of any one of Examples 13 to 19, wherein the secret first element is a polynomial and the masking component is a coefficient for a polynomial.

Example 21 is the method of any one of Examples 13 to 20, wherein the secret first element at least partially represents a cryptographic key.

Example 22 is the method of any one of Examples 13 to 21, performed by a security controller.

Example 23 is the method of any one of Examples 13 to 22, including determining the masking component using an output of a random number generator.

Example 24 is the method of any one of Examples 13 to 23, including performing the lattice-based cryptography operation in a signature or public key crypto processing.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

Reference Signs 100 processing device
101 CPU
102 RAM
103 NVM
104 crypto module
105 bus
106 analog module
107 I/O interface
108 LBC core
109 AES core
110 SHA core
111 ECC core
112 HRNG
200 processing diagram
300 flow diagram
301 processing operations

What is claimed is:

1. A cryptographic processing device for strengthening a computer against attack such as from a quantum computer, comprising: a hardware processor configured to:
   determine a masking component;
   generate a masked version of a secret first element by masking multiple components of the secret first element with the masking component;
   determine a first share of the product of the secret first element and a second element by multiplying the second element with the masked version of the secret first element;
   determine a second share of the product of the secret first element and the second element by multiplying the second element with the difference of the secret first element and the masked version of the secret first element; and
   continue with a lattice-based cryptography operation using the first share and the second share of the product;
   wherein the secret first element is a vector of polynomials, wherein the second element is a matrix of polynomials and the masking component is a polynomial; or
   wherein the secret first element is a polynomial and the masking component is a coefficient for a polynomial.

2. The cryptographic processing device of claim 1, wherein the hardware processor is further configured to determine a further masking component, mask multiple components of the sum of the first share of the product and the second share of the product using the further masking component to generate a masked version of the product and perform the lattice-based cryptography operation using the masked version of the product.

3. The cryptographic processing device of claim 1, wherein masking the multiple components by the masking component comprises adding the masking component or a scalar multiple of the masking component to each of the multiple components.

4. The cryptographic processing device of claim 1, wherein the hardware processor is further configured to determine a further masking component, wherein generating the masked version of the secret first element comprises masking a first set of components of the secret first element by the masking component and a second set of components of the secret first element by the further masking component.

5. The cryptographic processing device of claim 4, wherein the first set and the second set are disjoint.

6. The cryptographic processing device of claim 1, wherein the secret first element at least partially represents a cryptographic key.

7. The cryptographic processing device of claim 1, wherein the cryptographic processing device is a security controller.

8. The cryptographic processing device of claim 1, comprising a random number generator, wherein the hardware processor is configured to determine the masking component using an output of the random number generator.

9. The cryptographic processing device of claim 1, wherein the hardware processor is configured to perform the lattice-based cryptography operation in a signature or public key crypto processing.

10. A method for strengthening a computer against attack such as from a quantum computer, by performing a lattice-based cryptography operation comprising:
- determining a masking component; generating a masked version of a secret first element by masking multiple components of the secret first element with the masking component;
- determining the product of a second element with the masked version of the secret first element to determine a first share of the product between the secret first element and the second element;
- determining the product of the second element with the difference of the secret first element and the masked version of the secret first element to determine a second share of the product between the secret first element and the second element; and
- continuing with a lattice-based cryptography operation using the first share and the second share of the product;
- wherein the secret first element is a vector of polynomials, wherein the second element is a matrix of polynomials and the masking component is a polynomial; or
- wherein the secret first element is a polynomial and the masking component is a coefficient for a polynomial.

* * * * *